May 19, 1964 — E. R. HELMINEN — 3,133,301
FROST-REMOVING DEVICE FOR WINDSHIELDS
Filed Sept. 22, 1961
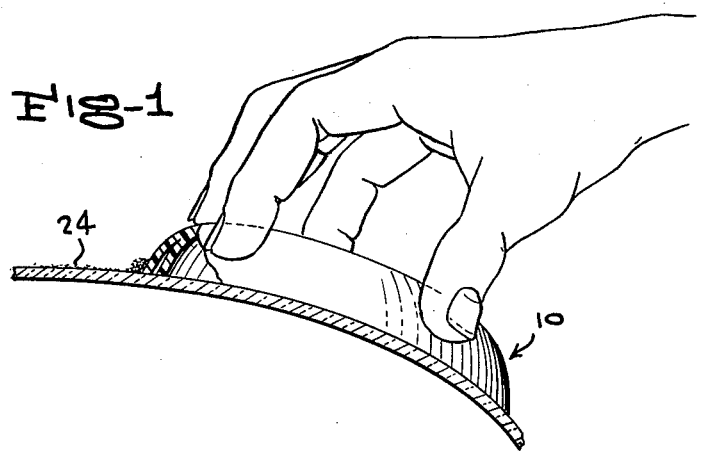
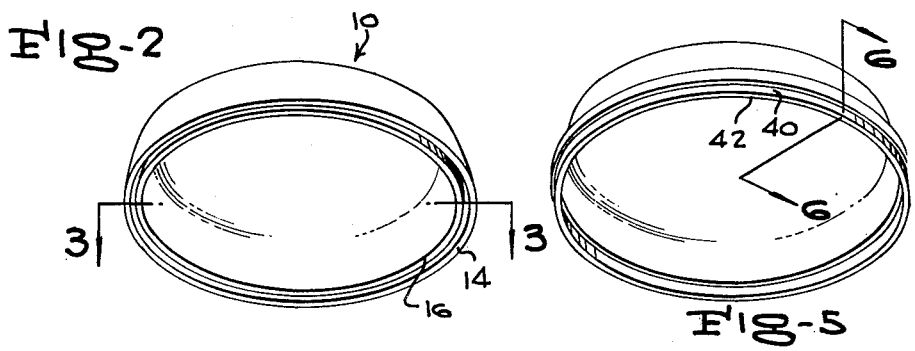
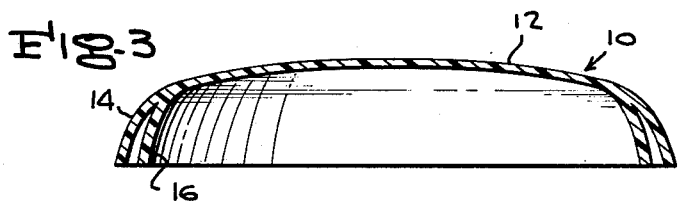
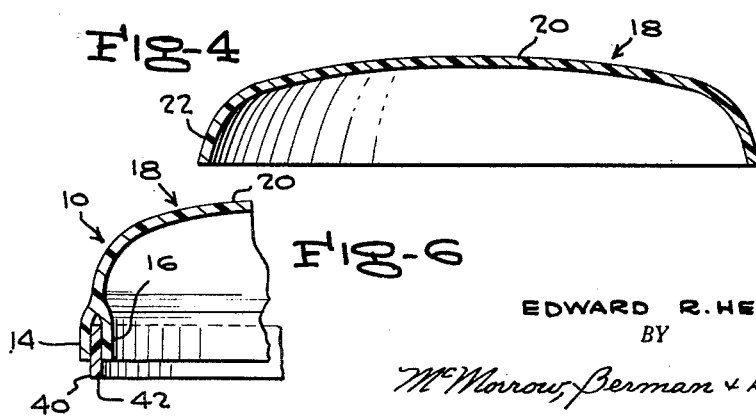
INVENTOR.
EDWARD R. HELMINEN
BY
McMorrow, Berman & Davidson
ATTORNEYS

United States Patent Office 3,133,301
Patented May 19, 1964

3,133,301
FROST-REMOVING DEVICE FOR WINDSHIELDS
Edward R. Helminen, 22824 Tulane, Farmington, Mich.
Filed Sept. 22, 1961, Ser. No. 139,922
1 Claim. (Cl. 15—245)

This invention pertains to frost-removing devices, and more specifically, the instant invention relates to devices for removing frost from the windshield of automotive vehicles, airplane windshields, and the windshields of any other motive type of vehicle.

It is, of course, well known that modern automobiles are, in most instances, provided with defrosting devices for defrosting the windshields thereof. However, these defrosting devices require that the motor be first energized and warmed up in order to provide the necessary warm stream of air to effect the defrosting operation. Some little time is required to effect this condition. Again, manually-operable frost scrapers are known in this art, but such scrapers are formed of rigid materials and their application to the conventional windshields having high curvatures results in an ineffective and inefficient cleaning of frost therefrom.

Consequently, one of the primary objects of this invention is to provide a frost-removing device for windshields having high curvatures, the frost-removing device being capable of following, effectively, the curvature of the windshield through any number of given points.

Another object of this invention is to provide a frost-removing device for curved windshields, the frost-removing device being formed of a pliable flexible material, such as rubber, or of plastic.

This invention contemplates, as a still further object thereof, the provision of a frost-removing device of the type generally refered to supra, the device being non-complex in construction and assembly, inexpensive to manufacture, and durable in use.

Other and further objects and advantages of the instant invention will become more evident from a consideration of the following specification when read in conjunction with the annexed drawing, in which:

FIGURE 1 is a side elevational view of a frost-removing device, partly broken away, FIGURE 1 illustrating the application of the frost-removing device to a conventional curved windshield for an automobile;

FIGURE 2 is a bottom perspective view of the frost-removing device illustrated in FIGURE 1;

FIGURE 3 is an enlarged detail cross-sectional view of the frost-removing device, FIGURE 3 being taken substantially on the line 3—3 of FIGURE 2, looking in the direction of the arrows;

FIGURE 4 is an enlarged detail cross-sectional view similar to FIGURE 3, FIGURE 4 illustrating a modification of this invention;

FIGURE 5 is a bottom perspective view of still another embodiment of this invention; and FIGURE 6 is an enlarged fragmentary detail cross-sectional view, FIGURE 6 being taken substantially on the vertical plane of line 6—6 of FIGURE 5, looking in the direction of the arrows.

Referring now more specifically to the drawing, reference numeral 10 designates, in general, a frost-removing device constructed in accordance with the teachings of this invention. The device 10 is formed of any suitable flexible material, such as, for example, rubber or a plastic.

In one preferred form, such as is illustrated in FIGURES 1 to 3, inclusive, the device 10 is seen to comprise a substantially discoidal back member 12 which, at its circumferential marginal edge, is provided with an angularly-projecting flange 14 which is integrally connected with a second continuous cylindrical flange 16. As is clearly seen in FIGURE 3, the flanges 14 and 16 are spaced from one another.

FIGURE 4 illustrates a second embodiment of this invention, wherein reference numeral 18 denotes the device in general. In this modification, the device 18 is seen to include a discoidal back member 20 which, at its circumferential marginal edge, has an arcuately-shaped laterally-projecting flange 22.

FIGURES 5 and 6 illustrate a still further embodiment of this invention wherein the device 10 is provided, intermediate the flanges 14, 16, with a removable or replaceable endless annular insert 40 which is fixedly held therebetween. The insert 40 has a width greater than the width of the flanges 14, 16 and normally projects, as at 40', beyond the outermost ends of the flanges 14, 16 in order to provide a window panel frost or dew-removing implement.

The use of these devies is shown in FIGURES 1 to 6, inclusive, wherein the fingers of the user are shown to be gripped substantially about the flange 14, the outer edges of the two flanges 14 and 16 being shown as engaging against the exterior surface of the conventional curved windshield 24. The flexibility of the device 10 permits the edges of the flanges 14, 16 or the insert 40 to follow the contour of the windshield, and a scrubbing or reciprocating movement of the user's hand relative to the windshield 24 will effectively scrape and remove any frost deposited thereon. The frost-removing device 18, shown in FIGURE 4, is operated in the same manner.

Having described and illustrated two embodiments of this invention in detail, it will be understood that the same are offered merely by way of example, and that this invention is to be limited only by the scope of the appended claim.

What is claimed is:

A device for removing frost from the windshield of a vehicle comprising a substantially discoidal member of flexible material and having a laterally-projecting bifurcated annular flange, and a removable annular scraping panel formed of flexible material constituting an insert frictionally secured within said bifurcated annular flange and projecting therebeyond.

References Cited in the file of this patent

UNITED STATES PATENTS

| | | |
|---|---|---|
| 1,927,350 | Schopp | Sept. 19, 1933 |
| 2,299,089 | Haan | Oct. 20, 1942 |
| 2,532,429 | Sparkman | Dec. 5, 1950 |
| 2,611,146 | Buckley | Sept. 23, 1952 |

FOREIGN PATENTS

| | | |
|---|---|---|
| 72,755 | Sweden | Sept. 29, 1931 |